US011356853B1

(12) United States Patent
Wu et al.

(10) Patent No.: US 11,356,853 B1
(45) Date of Patent: Jun. 7, 2022

(54) DETECTION OF MALICIOUS MOBILE APPS

(71) Applicant: Trend Micro Incorporated, Tokyo (JP)

(72) Inventors: Longping Wu, Nanjing (CN); Hua Ye, Nanjing (CN); Bin Yin, Nanjing (CN); Zhihua Zhou, Nanjing (CN); Zhengbao Zhang, Nanjing (CN)

(73) Assignee: TREND MICRO INCORPORATED, Tokyo (JP)

( * ) Notice: Subject to any disclaimer, the term of this patent is extended or adjusted under 35 U.S.C. 154(b) by 99 days.

(21) Appl. No.: 17/028,364

(22) Filed: Sep. 22, 2020

(51) Int. Cl.
*G06F 21/12* (2013.01)
*G06F 21/56* (2013.01)
*H04W 12/128* (2021.01)
*G06K 9/62* (2022.01)
*G06F 8/52* (2018.01)
*H04W 12/30* (2021.01)

(52) U.S. Cl.
CPC ............ *H04W 12/128* (2021.01); *G06F 8/52* (2013.01); *G06F 21/125* (2013.01); *G06F 21/563* (2013.01); *G06K 9/6215* (2013.01); *H04W 12/30* (2021.01); *G06F 2221/033* (2013.01)

(58) Field of Classification Search
CPC ....... H04W 12/128; H04W 12/30; G06F 8/52; G06F 8/60; G06F 21/57; G06F 21/125; G06F 21/563; G06F 2221/033; G06K 9/6215
See application file for complete search history.

(56) References Cited

U.S. PATENT DOCUMENTS

| | | | | |
|---|---|---|---|---|
| 8,607,224 B2* | 12/2013 | Kohler | ................. | G06F 9/4484 717/174 |
| 8,844,032 B2* | 9/2014 | Saidi | ................. | G06F 21/6218 726/22 |
| 9,396,325 B2* | 7/2016 | Kendall | ................ | H04W 12/37 |
| 9,519,780 B1* | 12/2016 | Dong | ................. | H04L 63/1408 |
| 9,553,889 B1* | 1/2017 | Kiwa | .................. | G06F 21/561 |
| 9,940,478 B2* | 4/2018 | Brutschy | ................. | G06F 8/65 |
| 10,565,377 B1* | 2/2020 | Zheng | ................. | G06F 21/563 |
| 2015/0026483 A1* | 1/2015 | Jiang | ..................... | G06F 21/12 713/190 |

OTHER PUBLICATIONS

MurmurHash—Wikipedia, 6 pages [retrieved on Aug. 28, 2020], retrieved from the internet: https://en.wikipedia.org/wiki/MurmurHash.

(Continued)

*Primary Examiner* — Hosuk Song
(74) *Attorney, Agent, or Firm* — Beyer Law Group LLP

(57) ABSTRACT

A mobile app is in a form of a package file. A structural feature digest is generated from contents of a manifest part, bytecode part, and resource part of the package file. A mobile device receives an unknown mobile app, generates a structural feature digest of the unknown mobile app, and sends the structural feature digests to a backend system over a computer network. In the backend system, the structural feature digest of the unknown mobile app is compared to structural feature digests of known malicious mobile apps. The unknown mobile app is detected to be malicious when its structural feature digest is similar to that of a known malicious mobile app.

17 Claims, 11 Drawing Sheets

(56) References Cited

OTHER PUBLICATIONS

Vassil Roussev "Data Fingerprinting with Similarity Digests" 2010, pp. 109-128, Chapter 8, Advances in Digital Forensics VI.

Vassil Roussev "An Evaluation of Forensic Similarity Hashes" 2011, pp. 34-41, Proceedings of The Digital Forensic Research Conference, New Orleans, LA.

Shinho Lee, et al. "Dexofuzzy: Android Malware Similarity Clustering Method Using Opcode Sequence", Oct. 2019, pp. 1-24, Virus Bulletin—covering the global threat landscape.

* cited by examiner

APK

Androidmanifest.xml

```
<?xml version="1.0" encoding="utf-8"?>
<manifest android:versionCode="1"
android:versionName="1.0"
package="com.xunjie.keji.gamegoa4"
xmlns:android="http://schemas.android.co
m/apk/res/android">
<uses-permission
android:name="android.permission.CAMER
A" />
...
<receiver
android:name="com.xunjie.keji.gamego.rec
eiver.MyReceiver" android:enabled="true"
android:exported="false">
  <intent-filter>
    <action
android:name="cn.jpush.android.intent.REC
EIVE_MESSAGE" />
    <category
android:name="com.xunjie.keji.gamegoa4"
/>
  </intent-filter>
</receiver>
...
```

`<permission />`  `<component />`  `<intent filter />` classes[*].dex

```
.method static
bindTabWithData(Lcom/ashokvarma/bottomnavigation/BottomNavigationItem;Lc
om/ashokvarma/bottomnavigation/BottomNavigationTab;Lcom/ashokvarma/bott
omnavigation/BottomNavigationBar;)V
  .locals 6
  .param p0, "bottomNavigationItem"    #
Lcom/ashokvarma/bottomnavigation/BottomNavigationItem;
  .param p1, "bottomNavigationTab"    #
Lcom/ashokvarma/bottomnavigation/BottomNavigationTab;
  .param p2, "bottomNavigationBar"    #
Lcom/ashokvarma/bottomnavigation/BottomNavigationBar;

.prologue
  .line 117
  invoke-virtual {p2}, Lcom/ashokvarma/bottomnavigation/BottomNavigationBar;-
>getContext()Landroid/content/Context;
  .line 120
  invoke-virtual {p0, v2},
Lcom/ashokvarma/bottomnavigation/BottomNavigationItem;-
>getIcon(Landroid/content/Context;)Landroid/graphics/drawable/Drawable;

move-result-object v5 invoke-virtual {p1, v5},
Lcom/ashokvarma/bottomnavigation/BottomNavigationTab;-
>setIcon(Landroid/graphics/drawable/Drawable;)V
```

Mnemonic / Syntax of bytecode

Resource

```
<?xml version="1.0" encoding="utf-8"?>
<LinearLayout n1:orientation="vertical"
xmlns:n1="http://schemas.android.com/apk
/res/android">
  <include layout="@layout/title_view" />
  <ScrollView n1:scrollbars="none"
n1:layout_width="fill_parent"
n1:layout_height="fill_parent">
    <LinearLayout n1:orientation="vertical"
n1:layout_width="fill_parent"
n1:layout_height="fill_parent">
      <TextView n1:textSize="16.0sp"
n1:textColor="@color/text_main_black"
n1:gravity="center" n1:id="@id/tv_title"
n1:padding="@dimen/dimen_15dp"
n1:layout_width="fill_parent"
n1:layout_height="wrap_content" />
      <TextView n1:textSize="12.0sp"
n1:gravity="center" n1:id="@id/tv_time"
n1:layout_width="fill_parent"
n1:layout_height="wrap_content" />
    </LinearLayout>
  </ScrollView>
</LinearLayout>
``` layout

APK

Androidmanifest.xml

| `<permission />` | `<component />` | `<intent filter />` |

*223*

- android.permission.ACCESS_LOCATION_EXT RA_COMMANDS, 1
- android.permission.CHANGE_NETWORK_ST ATE, 1
- android.permission.GET_TASKS, 1
- android.permission.ACCESS_BACKGROUND _LOCATION, 1
- RECEIVER, 9
- SERVICE, 15
- ACTIVITY, 62
- PROVIDER, 2
- cn.jpush.android.intent.RECEIVE_MESSAGE, 1
- cn.jiguang.user.service.action, 1
- android.intent.action.MAIN, 1
- cn.jpush.android.ui.PushActivity, 1
- cn.jpush.android.intent.REGISTER, 1
- cn.jpush.android.intent.REPORT, 1
- cn.jpush.android.intent.PushService, 1
- cn.jpush.android.intent.PUSH_TIME, 1
- cn.jpush.android.intent.DaemonService, 1
- cn.jpush.android.intent.NOTIFICATION_REC EIVED_PROXY, 1 classes[*].dex

Mnemonic / Syntax of bytecode in 3grams

*224*

- iput-object&iput-object&invoke-direct, 2093
- iput-object&invoke-direct&return-void, 6797
- invoke-direct&return-void&iget-object, 6818
- return-void&iget-object&invoke-virtual, 10255
- iget-object&invoke-virtual&return-void, 14749
- invoke-virtual&return-void&iget-object, 10486
- return-void&iget-object&return-object, 2646
- iget-object&return-object&new-instance, 300
- return-object&new-instance&invoke-direct, 3195
- new-instance&invoke-direct&invoke-virtual, 9615
- invoke-direct&invoke-virtual&move-result-object, 12348
- invoke-virtual&move-result-object&iget-object, 10255
- move-result-object&iget-object&invoke-virtual, 8540
- iget-object&invoke-virtual&move-result-object, 33348 ← Term frequency
- invoke-virtual&move-result-object&const-string, 16430
- move-result-object&const-string&invoke-virtual, 14895
- const-string&invoke-virtual&move-result-object, 27520
- invoke-virtual&move-result-object&invoke-virtual, 78078
- move-result-object&invoke-virtual&move-result-object, 68404
- invoke-virtual&move-result-object&return-object, 15344
- move-result-object&return-object&const-wide/16, 195
- return-object&const-wide/16&iget-wide, 15
- const-wide/16&iget-wide&move-wide, 20
- move-wide&invoke-static/range&cmp-long, 15
- invoke-static/range&cmp-long&if-lez, 12

Resource

Layout in 3grams

*225*

- ScrollView&Button&Button, 2
- Button&Button&Button, 5
- Button&Button&LinearLayout, 2
- Button&LinearLayout&LinearLayout, 1
- LinearLayout&LinearLayout&ImageView, 19
- LinearLayout&ImageView&LinearLayout, 15
- ImageView&LinearLayout&include, 4
- LinearLayout&include&LinearLayout, 13
- include&LinearLayout&ImageView, 7
- LinearLayout&ImageView&TextView, 46
- ImageView&TextView&LinearLayout, 39
- TextView&LinearLayout&LinearLayout, 22
- LinearLayout&LinearLayout&TextView, 34
- LinearLayout&TextView&TextView, 69
- TextView&TextView&LinearLayout, 51
- TextView&LinearLayout&TextView, 44
- TextView&TextView&View, 15
- TextView&View&LinearLayout, 12
- View&LinearLayout&LinearLayout, 4
- TextView&View&TextView, 16
- View&TextView&TextView, 5
- TextView&TextView&TextView, 51
- View&TextView&LinearLayout, 9

| Scales | Meaning |
|---|---|
| 1 | Expressing equal importance compared to two factors |
| 3 | One factor is slightly more important than the other |
| 5 | One factor is significantly more important than the other |
| 7 | One factor is strongly important than the other |
| 9 | One factor is extremely important than the other |
| 2, 4, 6, 8 | Median value of the above two adjacent judgments |
| Reciprocal | The judgment of the factor $i$ compared with the factor $j$ is $a_{ij}$, then the comparison of the factor $j$ and factor $i$ is judged as the reciprocal |

FIG. 5

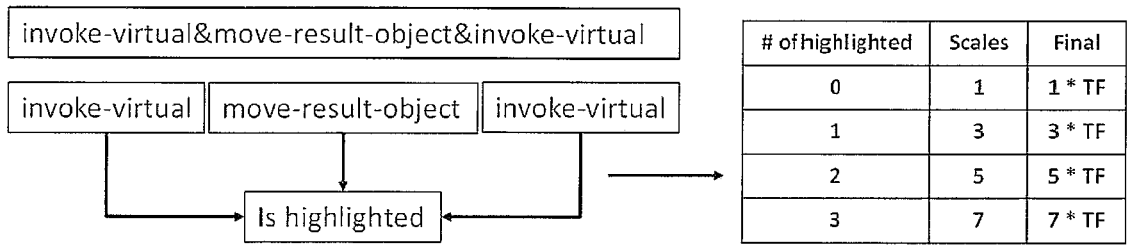

| # of highlighted | Scales | Final |
|---|---|---|
| 0 | 1 | 1 * TF |
| 1 | 3 | 3 * TF |
| 2 | 5 | 5 * TF |
| 3 | 7 | 7 * TF |

FIG. 6

DETECTION OF MALICIOUS MOBILE APPS

BACKGROUND OF THE INVENTION

1. Field of the Invention

The present invention relates generally to cybersecurity, and more particularly but not exclusively to detecting malicious mobile apps.

2. Description of the Background Art

Mobile devices, such as smartphones and tablets, have become commonplace and are now employed not just to make voice calls, but also to browse the Internet, watch streamed video, make online purchases, play online games, etc. However, despite their increasing sophistication, mobile devices remain resource-constrained relative to laptop and desktop computers and accordingly run a mobile operating system, such as the ANDROID operating system. An application program that runs under a mobile operating system is referred to as a "mobile app" or simply as an "app." Mobile apps may be obtained from an official app store, such as the GOOGLE PLAY app store and AMAZON app store for ANDROID-based mobile devices. Mobile apps may also be obtained from other sources.

As its name indicates, a malicious mobile app contains malicious code, such as a computer virus A malicious mobile app may be detected using a cryptographic hash function (e.g., Secure Hash Algorithm 2) to generate a cryptographic digest of a known malicious mobile app and using the cryptographic digest as a signature for scanning unknown mobile apps. One problem with this solution is that a malicious mobile app may have multitudes of variants, especially highly-obfuscated malicious mobile apps generated using packing (i.e., compression) or automated generation software. Each variant may require its own cryptographic digest, thereby increasing the number of digests that need to be generated and matched during scanning.

A malicious mobile app may also be detected by pattern-matching, which has problems similar to those of using a cryptographic hash function. More particularly, for highly-obfuscated variants generated by automated generation software, a pattern that is based on character strings, regular expressions, etc. may have to be changed to detect different variants. Worse, such patterns may be rendered useless when the automated generation system encrypts variables, values, etc. of the malicious mobile app.

A malicious mobile app may also be executed in a sandbox to monitor its runtime behavior for malicious actions. Generally speaking, sandboxing consumes a lot of computational resources, as it requires unpacking, running, and monitoring an unknown mobile app. Sandboxing may also not be feasible and may have low success rate with highly-obfuscated variants generated by automated generation software.

A malicious mobile app may be detected by fuzzy hashing, such as by using the Dexofuzzy hash generator, to generate a locality-sensitive digest. The Dexofuzzy function is based on an N-gram tokenizer and uses the SSDEEP fuzzy hashing function to generate a digest of the bytecode of an ANDROID package file. The Dexofuzzy hash generator may result in relatively high false positive rates and slow scanning times.

SUMMARY

In one embodiment, a mobile app is in a form of a package file. A structural feature digest is generated from contents of a manifest part, a bytecode part, and a resource part of the package file. A mobile device receives an unknown mobile app, generates a structural feature digest of the unknown mobile app, and sends the structural feature digest to a backend system over a computer network. In the backend system, the structural feature digest of the unknown mobile app is compared to structural feature digests of known malicious mobile apps. The unknown mobile app is detected to be malicious when its structural feature digest is similar to that of a known malicious mobile app.

These and other features of the present invention will be readily apparent to persons of ordinary skill in the art upon reading the entirety of this disclosure, which includes the accompanying drawings and claims.

DESCRIPTION OF THE DRAWINGS

FIGS. 2-8 pictorially illustrate a method of generating a structural feature digest in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. For example, specific features, terms, instructions, bit positions, scaling factors, etc. are provided below and in the figures. Persons of ordinary skill in the art will recognize, however, that the invention can be practiced without one or more of the specific details. In other instances, well-known details are not shown or described to avoid obscuring aspects of the invention.

Figure 1:
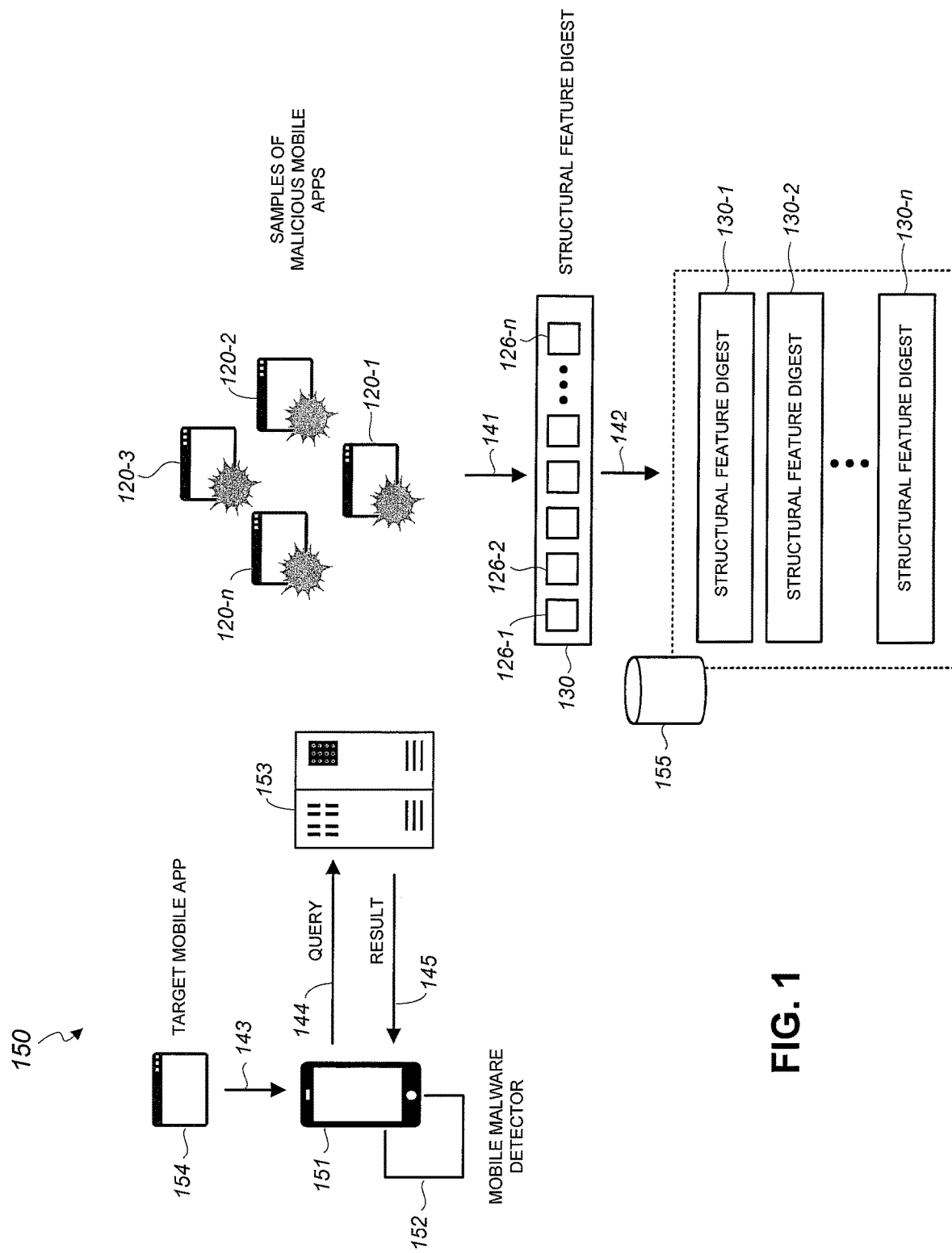
FIG. 1 shows a logical diagram of a system for detecting malicious mobile apps in accordance with an embodiment of the present invention.

FIG. 1 shows a logical diagram of a system 150 for detecting malicious mobile apps in accordance with an embodiment of the present invention. In the example of FIG. 1, the system 150 includes a mobile device 151 and a backend system 153. The mobile device 151 and the backend system 153 may communicate over a computer network including over the Internet.

The backend system 153 may comprise one or more computers that are configured to detect malicious mobile apps. The backend system 153 may comprise server computers of a cloud computing infrastructure, for example. In one embodiment, the backend system 153 is configured to scan mobile apps of the ANDROID operating system for malicious code. As can be appreciated, embodiments of the present invention may also be adapted to detect malicious mobile apps of other mobile operating systems.

Information about the ANDROID operating system is generally available on the Internet and other sources. Briefly, an ANDROID mobile app is distributed as a package file, which is referred to as an ANDROID package (APK) file. An APK file is an archive containing files and directories. An APK file includes a manifest part, a bytecode part, and a resource part. The manifest part has essential information and basic information about the mobile app, runtime permissions, the components of the mobile app, and hardware and software features. The bytecode part includes the bytecode that will be executed on the mobile device to perform the function of the mobile app. In the ANDROID operating system, the bytecode is in the DEX file format, and may be executed by a DALVIK process virtual machine or the ANDROID Runtime (ART). The bytecode may be written in the JAVA or KOTLIN programming language, for example. The resource part includes the additional files and static content that are used by the mobile app, such as bitmaps, layout definitions, user interface strings, animation instructions, etc.

The backend system 153 may receive samples of malicious mobile apps 120 (i.e., 120-1, 120-2, . . . , 120-n). The samples of malicious mobile apps 120 may be received from antivirus researchers, honeypots, cybersecurity feed, etc. In one embodiment, a malicious mobile app 120 is a known malicious mobile app for the ANDROID operating system. The backend system 153 is configured to generate a structural feature digest 130 for each malicious mobile app 120 (see arrow 141). The backend system 153 (a) extracts the contents of the manifest part, bytecode part, and resource part from the mobile app 120; (b) generates initial digests for the contents of the manifest part, bytecode part, and resource part; (c) and processes the initial digests to generate a structural feature digest 130 of the malicious mobile app 120. Advantageously, compared to digests that only takes the contents of the bytecode into account, a structural feature digest 130 is much less prone to false positives. Furthermore, because the structural feature digest 130 also takes into account the contents of the manifest and resource parts, the structural feature digest 130 allows for detection of variants of malicious mobile apps with packed bytecode parts.

In the example of FIG. 1, a structural feature digest 130 is segmented into a plurality of distinct chunks 126 (i.e., 126-1, 126-2, . . . , 126-n). In one embodiment, a structural feature digest 130 is a 192-bit digest, with each chunk 126 being a 32-bit binary number. In that embodiment, one chunk 126 is a 32-bit digest of the contents of the manifest part, another chunk 126 is a 32-bit digest of the contents of the resource part, and six chunks 126 form a 128-bit digest of the contents of the bytecode part. As can be appreciated, the size of a structural feature digest and its chunks may be varied to meet the needs of a particular cybersecurity application. Segmenting a structural digest 130 into a plurality of chunks 126 advantageously speeds up searching by allowing for split queries.

Structural feature digests 130 (i.e., 130-1, 130-2, . . . , 130-n) of the malicious mobile apps 120 may be stored in a data storage device 155 (see arrow 142). In the example of FIG. 1, the structural feature digest 130-1 is that of the malicious mobile app 120-1, the structural feature digest 130-2 is that of the malicious mobile app 120-2, and so on. The data storage device 155 may be a solid state drive, hard drive, nonvolatile memory, or other suitable device for storing data. The structural feature digests 130 may be stored and searched using MySQL database, ElasticSearch search engine, etc.

In one embodiment, the mobile device 151 is an ANDROID device, i.e., runs the ANDROID operating system. The mobile device 151 may be a smartphone, tablet, or some other mobile device. A user may download a target mobile app 154 onto the mobile device 151 (see arrow 143). The mobile app 154 is a "target" in that it is going to be inspected for malicious code, because the mobile app 154 has an unknown reputation. It is not known whether or not the target mobile app 154 is safe.

In one embodiment, the mobile device 151 includes a mobile malware detector 152. The mobile malware detector 152 may comprise computer-readable program code for receiving the target mobile app 154 and generating a structural feature digest of the target mobile app 154, which is also referred to herein as a "target digest." The mobile malware detector 152 is configured to generate the target digest in the same manner as previously described to generate a structural feature digest 130 of a malicious mobile app 120. This facilitates comparison of the target digest to the structural feature digests 130. The mobile malware detector 152 is configured to send a query (see arrow 144), which includes the target digest, to the backend system 153 to determine if the target mobile app 154 is malicious.

In the example of FIG. 1, the backend system 153 provides an in-the-cloud, i.e. over the Internet, mobile app inspection service to subscribing mobile devices, such as the mobile device 151. The backend system 153 and subscribing mobile devices may communicate in accordance with Representational State Transfer (REST) or other suitable software architecture.

The backend system 153 receives the query from the mobile device 151 (see arrow 144). As can be appreciated, the backend system 153 may receive the query from the mobile device 151 by way of network devices that are not shown, such as routers, gateways, etc., between the backend system 153 and the mobile device 151. The backend system 153 extracts the target digest from the query and searches the storage device 155 for a structural feature digest 130 that is similar to the target digest.

The mathematical distance between two digests may be measured to determine the similarity of the two digests, and hence the similarity of the corresponding data from which the digests were generated. The shorter the distance, the more similar the digests. The degree of similarity between two digests depends on the hashing function employed to generate the digests. For example, two digests that are generated using a cryptographic hashing function may require an exact match to be similar. In contrasts, two digests that are generated using a non-cryptographic hashing function (e.g., MurmurHash function) may require the two digests to be within a predetermined mathematical distance to be similar.

In one embodiment, the backend system 153 (and the mobile malware detector 152) employs a non-cryptographic hashing function to generate a structural feature digest. The backend system 153 performs a similarity search by determining the mathematical distance between the target digest and each of the structural feature digests 130. Because a structural feature digest 130 is divided and stored as distinct chunks, the backend system 153 does not necessarily have to compare the entirety of a structural feature digest 130 to the entirety of the target digest at the same time. Instead, the backend system 153 is able to compare corresponding chunks, one pair of chunks at a time, of the target digest and a structural feature digest 130 to determine similarity of the two digests. This advantageously allows for scalable and fast similarity searching.

The target digest is similar to a structural feature digest 130 when the two digests are within a predetermined mathematical distance. The backend system 153 returns a result of the similarity searching to the mobile device 151 (see arrow 145). The target mobile app 154 is deemed to be malicious when the result indicates that the target digest is similar to a structural feature digest 130. As can be appreciated, the target mobile app 154 is not necessarily safe when the result indicates that the target digest is not similar to any of the structural feature digests 130 in the backend system 153. For example, the target mobile app 154 may be a completely new malicious mobile app, and accordingly has no corresponding structural feature digest 130 in the backend system 153.

FIGS. 2-8 pictorially illustrate a method of generating a structural feature digest in accordance with an embodiment of the present invention. It is to be noted that the following figures show specific values for bit positions, scaling factors, etc. These specific values are shown for illustration purposes only.

Referring first to FIG. 2, there is shown example contents of an APK file. As can be appreciated, different APK files will have different manifest, bytecode, and resource contents. The contents of an APK file may be extracted to human-readable format, e.g., as shown in FIG. 2, using a suitable tool (e.g., Apktool or Androguard).

An APK file includes a manifest part, a bytecode part, and a resource part. The manifest part is included in the APK file as an XML file ("Androidmanifest.xml"), the bytecode part is included in the APK file as a DEX file ("classes[*].dex"), and the resource part is included in the APK file as a resource file ("resources.arsc") and/or as static content.

A "feature" is a basic and essential content of an APK file. Generally speaking, an ANDROID app project has an AndroidManifest.xml file at the root of the project source set. The manifest file describes essential information about the mobile app to the ANDROID build tools, the ANDROID operating system, and GOOGLE PLAY app distribution service. The features in the manifest part include permissions that the mobile app needs in order to access protected parts of the system or other mobile apps. The features in the manifest part also include declarations of permissions that other mobile apps must have if they want to access content from the mobile app. The features in the manifest part also include the components of the mobile app, such as all activities, services, broadcast receivers, and content providers. Each component defines basic properties, such as the name of its Kotlin or Java class. A component can also declare capabilities, such as which device configurations the component can handle, and intent filters that describe how the component can be started. App activities, services, and broadcast receivers are activated by intents. An intent is a message defined by an Intent object that describes an action to perform, including the data to be acted upon, the category of component that should perform the action, and other instructions.

The features in the bytecode part include the bytecode of the mobile app, such as the mnemonic and syntax of the bytecode. Features in the bytecode part may be represented as an n-gram, which is treated as a single term. That is, instead of representing each single feature as a term, a term of the bytecode may represent a concatenation of consecutive n-number of features. For example, assuming the bytecode part includes consecutive instructions INST_1, INST_2, INST_3, INST_4, INST_5, etc., a first term of the bytecode part may be represented as INST_1&INST_2&INST_3;

a second term of the bytecode part may be represented as INSTR_2&INST_3&INST_4;

a third term of the bytecode part may be represented as INST_3& INST_4&INST_5; etc., with "&" serving as a delimiter between consecutive instructions. In this example, each term is a trigram of instructions in the bytecode part.

The resource part includes the additional files and static contents that the mobile app uses, such as bitmaps, layout definitions, user interface strings, animation instructions, etc. The features in the resource part indicate layout definitions. The features of the resource part may also be represented an as an n-gram that is treated as a single term. In one embodiment, each term in the resource part is a trigram of features.

FIG. 3 shows example contents of an APK file after preprocessing to extract and consolidate the features of the manifest, bytecode, and resource parts into terms. The preprocessing may include removing non-feature elements, such as extraneous spaces, comments, operands, function names, class names, and other content-related elements that are not relevant to the features. In the example of FIG. 3, each term includes a term frequency, i.e., how many times a term occurs in the corresponding part of the APK.

In the example of FIG. 3, in the manifest part, a single feature is considered as a single term. For example, the permission "android.permission.ACCESS_LOCATION_EXTRA_COMMANDS" (see FIG. 3, 223) is a single term with a term frequency of "1", i.e., occurs one time in the manifest part.

The features in the bytecode part may be formed as n-grams, with an n-gram being treated as a single term. This preserves the sequence the instructions appear in the bytecode part. In the example of FIG. 3 (see FIG. 3, 224), the consecutive instructions "invoke-direct", "return-void", and "iget-object" are concatenated to form the trigram "invoke-direct&return-void&iget-object", with "&" as a delimiter. The aforementioned trigram occurs 6818 times in the bytecode part (see FIG. 3, 224).

Similarly, the features in the resource part may also be formed as consecutive n-grams, with an n-gram being treated as a single term. For example (see FIG. 3, 225), the consecutive layouts "button", "button", and "LinearLayout" are formed as a trigram "button&button&LinearLayout", with "&" as a delimiter. The aforementioned trigram occurs two times in the resource part (see FIG. 3, 225).

Figure 4:
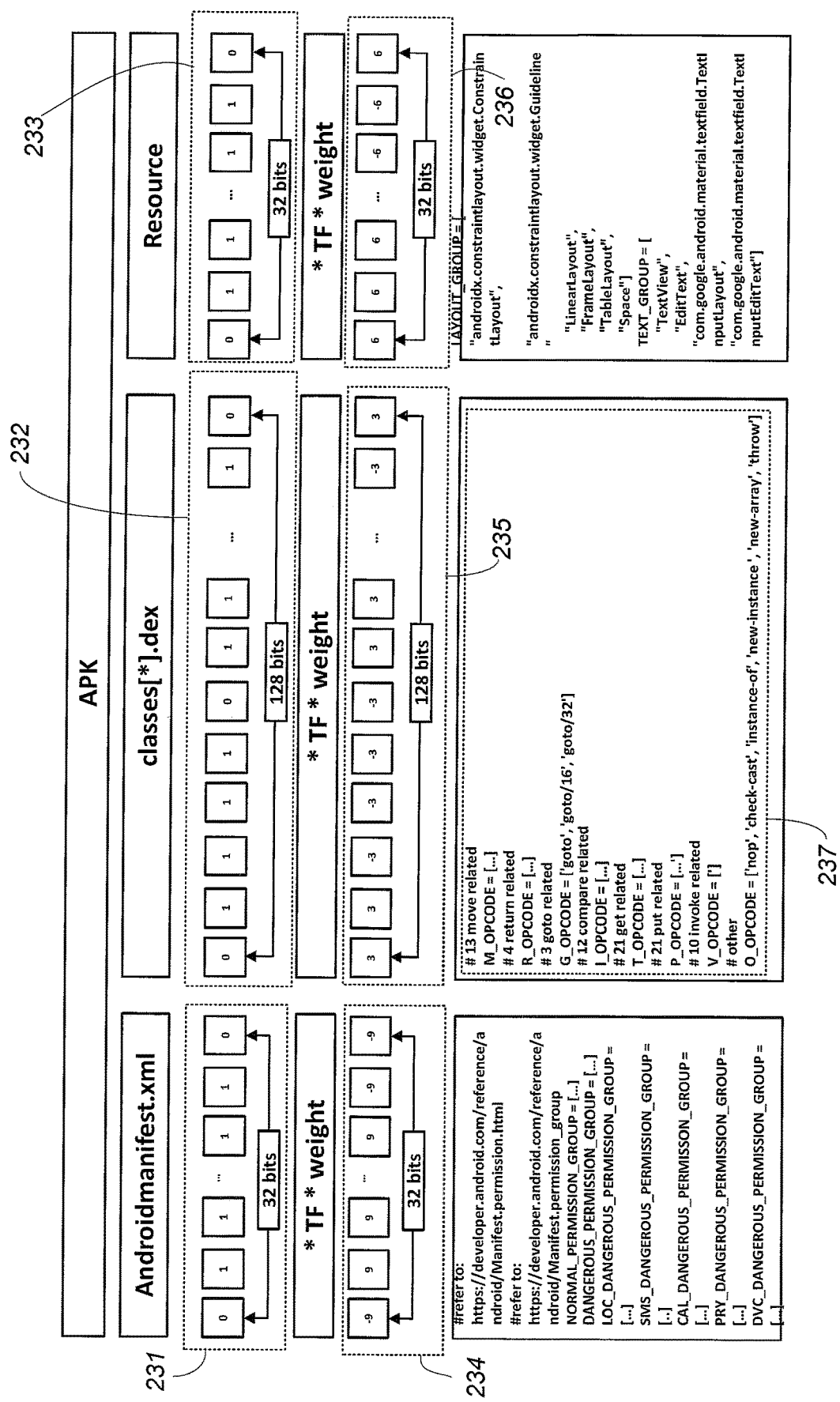

FIG. 4 illustrates generation of an initial digest of each term in the manifest, bytecode, and resource parts of an APK file. To facilitate similarity searching, a non-cryptographic hash function is employed to generate the initial digest of a term. In one embodiment, the MurmurHash function is employed to generate the initial digests of the terms of the manifest, bytecode, and resource parts of the APK file. Other suitable non-cryptographic hash functions may also be employed without detracting from the merits of the present invention.

In the example of FIG. 4, a non-cryptographic hash function is employed to generate a 32-bit initial digest for each term of the manifest part (see FIG. 4, 231), to generate a 128-bit initial digest for each term of the bytecode part (see FIG. 4, 232), and to generate a 32-bit initial digest for each term of the resource part (see FIG. 4, 233). FIG. 4 shows an initial digest of a single term of the manifest, bytecode, and resource parts. In actuality, there will be a plurality of terms and thus a plurality of initial digests for the manifest, bytecode, and resource parts.

An initial digest is a binary number. A binary number has bit positions from a least significant bit (LSB) to a most significant bit (MSB). In the initial digest, the value in each bit position is either a logical "1" or a logical "0." As will be more apparent below, the values in the bit positions will be processed so that they are integers at some points during processing. At the end of the processing, the integers in the bit positions will be projected back to binary bits to generate the structural feature digest.

In one embodiment, for each initial digest, a logical "0" in a bit position is converted to the integer "−1", and each bit position is thereafter multiplied by a scaling factor to generate a scaled value. FIG. 4 shows scaled values for bit positions of an initial digest of the manifest part (see FIG. 4, 234), the bytecode part (see FIG. 4, 235), and the resource part (see FIG. 4, 236). The manifest, bytecode, and resource parts have a plurality of initial digests, and the aforementioned conversion to integer and scaling is performed for each initial digest. As will be later explained with reference to FIG. 7, all scaled values in the same bit position will be added together to generate a set of accumulated values for that bit position, and the set of accumulated values will be subsequently projected to a binary number to generate a structural feature digest as shown in FIG. 8.

In one embodiment, the scaling factor is based on the term frequency (TF) and the scale assigned to the term as now explained with reference to FIGS. 5 and 6. FIG. 5 show example scales that are applied depending on the one or more features included in a term. Because the possible features of an APK file are constrained by specification, and samples of malicious mobile apps are available for research, antivirus researchers may assign importance on particular features based on how often they are found in malicious codes. A scale indicates the importance assigned to the term. Terms with features that are commonly found in malicious codes are given higher scales, and thus more importance.

As a particular example, FIG. 4 shows an example set of instructions in the bytecode part that are commonly-found in malicious codes (FIG. 4, 237). In the example of FIG. 4, these instructions, which are also referred to as "highlighted opcode," include "M_OPCODE", "R_OPCODE", "G_OPCODE", "I_OPCODE", "T_OPCODE", "P_OPCODE", "V_OPCODE", and "O_OPCODE."

Referring to FIG. 6 as an example, the term being processed is a trigram consisting of features "invoke-virtual", "move-result-object", and "invoke-virtual" instructions. The scale applied to the term is based on how many of the instructions in the trigram is a "highlighted opcode," i.e., in the set of instructions that are commonly-found in malicious codes. If no instruction of the trigram is a highlighted opcode, the term is assigned a scale of "1"; if one instruction of the trigram is a highlighted opcode, the term is assigned a scale of "3"; if two instructions of the trigram are highlighted opcodes, the term is assigned a scale of "5"; and if all instructions of the trigram are highlighted opcodes, the term is assigned a scale of "7". The final scaling factor of the term is the product of its scale times its term frequency (TF). Each bit position of the initial digest of the term is then multiplied by the scaling factor.

The same scaling procedure may be applied to the bit positions of the initial digests of the manifest and resource parts. As can be appreciated, other scaling factors or procedures may also be employed without detracting from the merits of the present invention.

Figure 7:
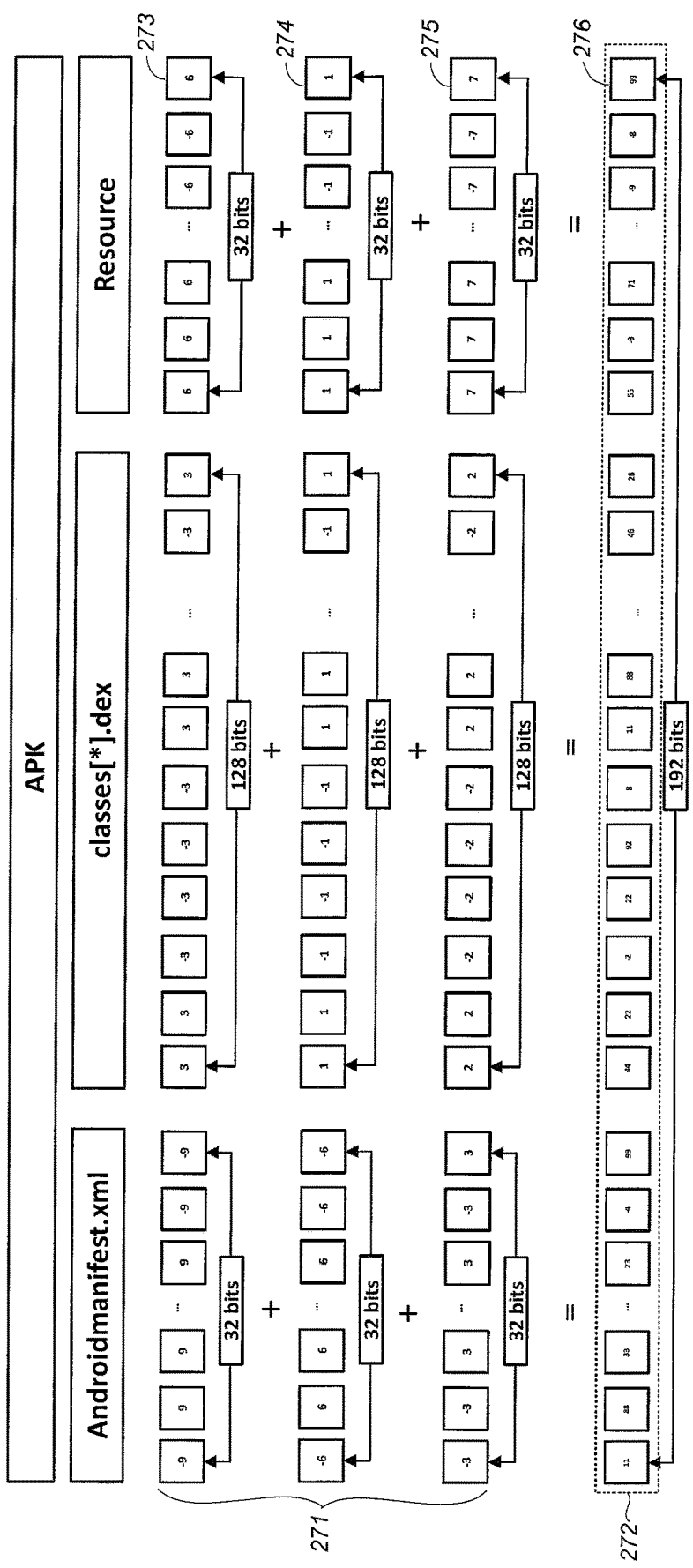
Figure 8:
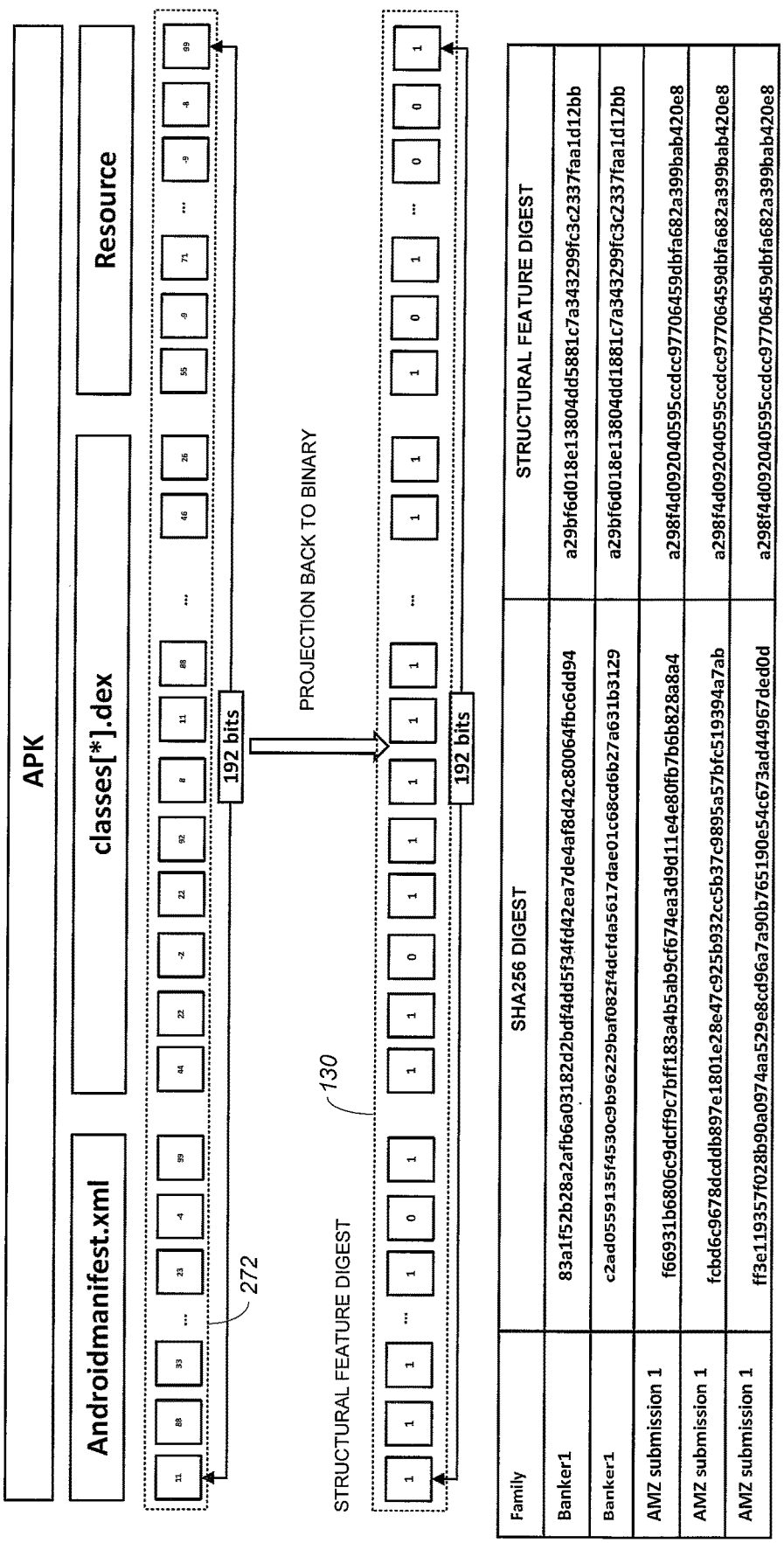

FIG. 7 shows scaled values in the bit positions of the initial digests after scaling (see FIG. 7, 271). Scaled values in the same bit position are added together to get a set of accumulated values for the bit position (see FIG. 7, 272). For example, the scaled values in the least significant bit positions (see FIG. 7, 273, 274, 275, etc.) are added to generate an accumulated value for the least significant bit position (see FIG. 7, 276). The accumulation is performed for all bit positions of all initial digests to generate the accumulated values of the bit positions (see FIG. 7, 272).

FIG. 8 shows the set of accumulated values of the bit positions (see FIGS. 7 and 8, 272) being projected back to binary to generate a structural feature digest 130. In one embodiment, the projection is performed by, for each bit position, converting a value equal to or greater than 1 to a logical "1"; otherwise the value is converted to a logical "0". In the example of FIG. 8, the conversion results in a structural feature digest 130 that is a 192-bit binary number.

FIG. 8 also shows cryptographic digests (SHA256) and structural feature digests of various malicious mobile app families ("Banker1", "AMZ submission 1"). As shown in FIG. 8, a single structural feature digest is able to represent different variants of a malicious mobile app, whereas several cryptographic digests may be needed to represent different variants of the same malicious mobile app.

Figure 9:
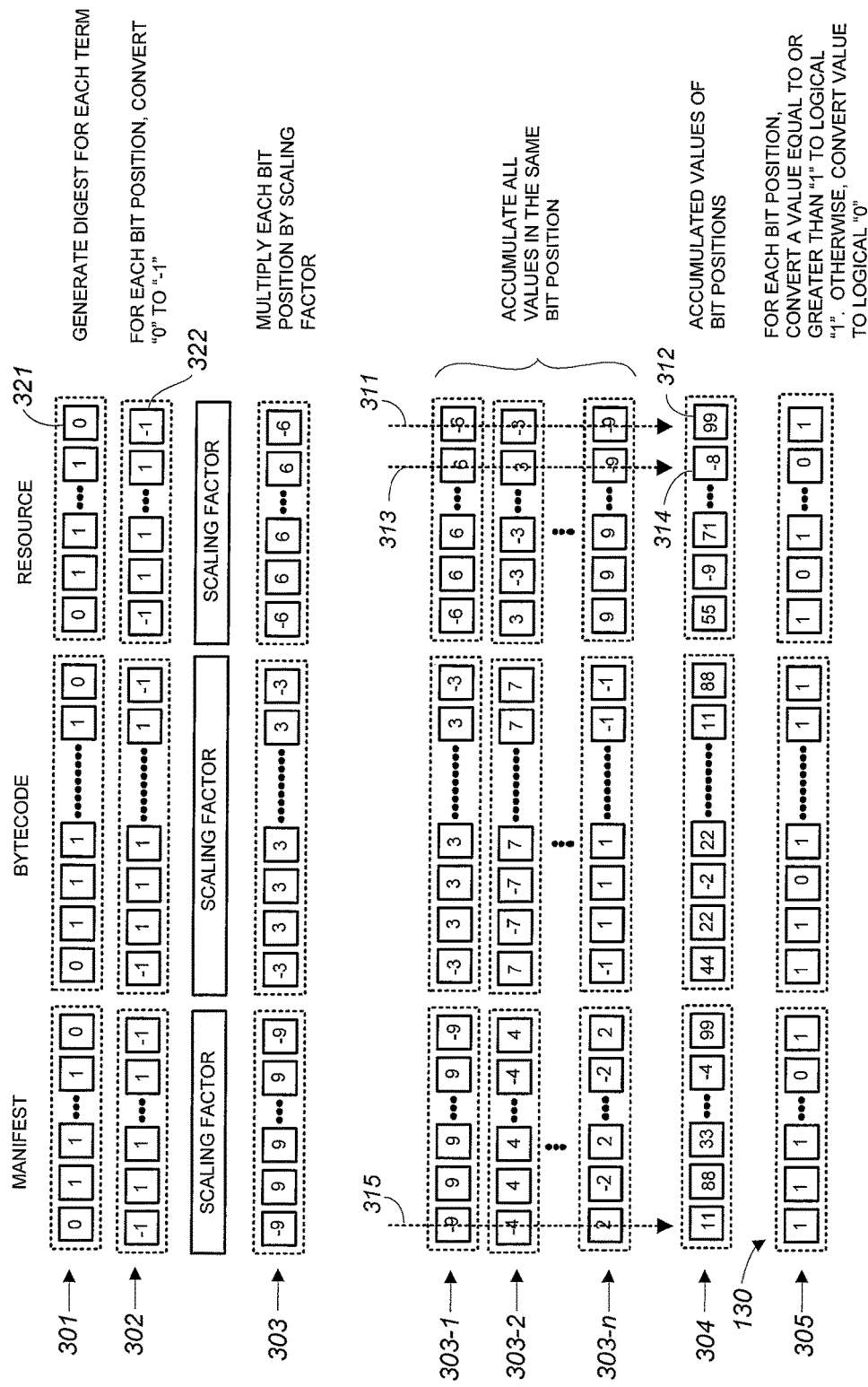
FIG. 9 pictorially illustrates a method of generating a structural feature digest in accordance with an embodiment of the present invention.

FIG. 9 pictorially illustrates a method 300 of generating a structural feature digest 130 in accordance with an embodiment of the present invention. The method 300 is explained from top to bottom, from row 301 to row 305. The column "manifest" shows values of bit positions of initial digests of terms of the manifest part, the column "bytecode" shows values of bit positions of initial digests of terms of the bytecode part, and the column "resource" shows values of bit positions of initial digests of terms of the "resource part."

In row 301, a non-cryptographic initial digest is generated for each term of the manifest, bytecode, and resource parts. Only one initial digest is shown for each of the manifest, bytecode, and resource parts for clarity of illustration. An initial digest is a binary number at this stage of the method 300. That is, each bit position holds either a logical "0" or logical "1" at this stage.

In row 302, for each bit position, a value of logical "0" is converted to an integer "−1". The bit positions now hold integers at this stage of the method 300. In the example of FIG. 9, the value at the least significant bit position (see FIG. 9, 321) is a logical "0" and is therefore converted to the integer "−1" (see FIG. 9, 322); the value at the next bit position is a logical "1" and is therefore retained as an integer "1"; and so on.

In row 303, each bit position is multiplied by a scaling factor.

Rows 303-1, 303-2, . . . , 303-$n$ show the scaled values of the bit positions after the bit positions are multiplied by a corresponding scaling factor. That is, row 303-1 show the scaled values of bit positions of an initial digest of a first term of the manifest part, of an initial digest of a first term of the bytecode part, and of an initial digest of a first term of the resource part; row 303-2 show the scaled values of bit positions of an initial digest of a second term of the manifest part, of an initial digest of a second term of the bytecode part, and of an initial digest of a second term of the resource part; and so on.

In row 304, the scaled values at the same bit positions are added to obtain a set of accumulated values. In the example of FIG. 9, the scaled values at the least significant bit positions (see FIG. 9, arrow 311) are added together to obtain an accumulated value for the least significant bit position (see FIG. 9, 312); the scaled values at the next bit positions (see FIG. 9, arrow 313) are added together to obtain an accumulated value for the next bit position (see FIG. 9, 314); and so on. The accumulation is performed for all bit positions up to the most significant bit position (see FIG. 9, arrow 315).

In row 305, the set of accumulated values are projected back to a binary number, which is a structural feature digest 130. The projection may be performed by, for each bit position, converting an integer value that is equal to or greater than "1" to a logical "1"; otherwise, the integer value is converted to a logical "0".

Tables 1, 2, and 3 show example pseudocodes for generating a structural feature digest for the manifest part, the bytecode part, and the resource part, respectively. The results of these pseudocodes may be concatenated as above to generate a 192-bit structural feature digest. The pseudocodes of Tables 1, 2, and 3 are provided for illustration purposes only.

TABLE 1

(Pseudocode for Manifest Part)

```
extracted_content = extract_content_from_apk(apk_file)
manifest_content = get_component_permission_intent_weighted(extracted_content)
hash_value = array with 32 of 0
FOR axml_item,occur_times IN manifest_content
    hash = MurmurHash(axml_item)
    scales = 1
    IF axml_item IN HighLightSet THEN
        scales = get_scales_by_highlight_group(axml_item)
    ENDIF
    occur_times = occur_times*scales
    hash_value = hash_value + hash*occur_times
ENDFOR
FOR i = 1 TO 32
    num = hash_value[i]
    IF num>=1 THEN
        hash_value[i] = 1
    ELSE
        hash_value[i] = 0
    ENDIF
ENDFOR
```

TABLE 2

(Pseudocode for Bytecode Part)

```
extracted_content = extract_content_from_apk(apk_file)
trigrams = bulid_trigrams_with_occur_times(extracted_content)
hash_value = array with 128 of 0
FOR trigram,occur_times IN trigrams
    hash = MurmurHash(trigram)
    element_list = split(trigram)
    count = 0
    FOR element IN element_list
        IF element IN HighLightSet THEN
            count = count+1
        ENDIF
    ENDFOR
    scales = map_count_to_scales(count)
    occur_times = occur_times*scales
    hash_value = hash_value + hash*occur_times
ENDFOR
FOR i = 1 TO 128
    num = hash_value[i]
    IF num>=1 THEN
        hash_value[i] = 1
    ELSE
        hash_value[i] = 0
    ENDIF
ENDFOR
```

TABLE 3

(Pseudocode for Resource Part)

```
extracted_content = extract_content_from_apk(apk_file)
trigrams = bulid_trigrams_with_occur_times(extracted_content)
hash_value = array with 32 of 0
FOR trigram,occur_times IN trigrams
    hash = MurmurHash(trigram)
    scales = get_scales_by_highlight_group(trigram)
    occur_times = occur_times*scales
    hash_value = hash_value + hash*occur_times
ENDFOR
FOR i = 1 TO 32
    num = hash_value[i]
    IF num>=1 THEN
        hash_value[i] = 1
    ELSE
        hash_value[i] = 0
    ENDIF
ENDFOR
```

As previously noted, a structural feature digest may be stored as separate chunks, rather than as a single value. This allows each chunk to be distinct from other chunks, allowing for flexibility in detecting similarity between chunks. The chunking, which is also referred to as segmentation, advantageously allows for detecting malicious mobile apps that have been packed, i.e., compressed.

Figure 10:
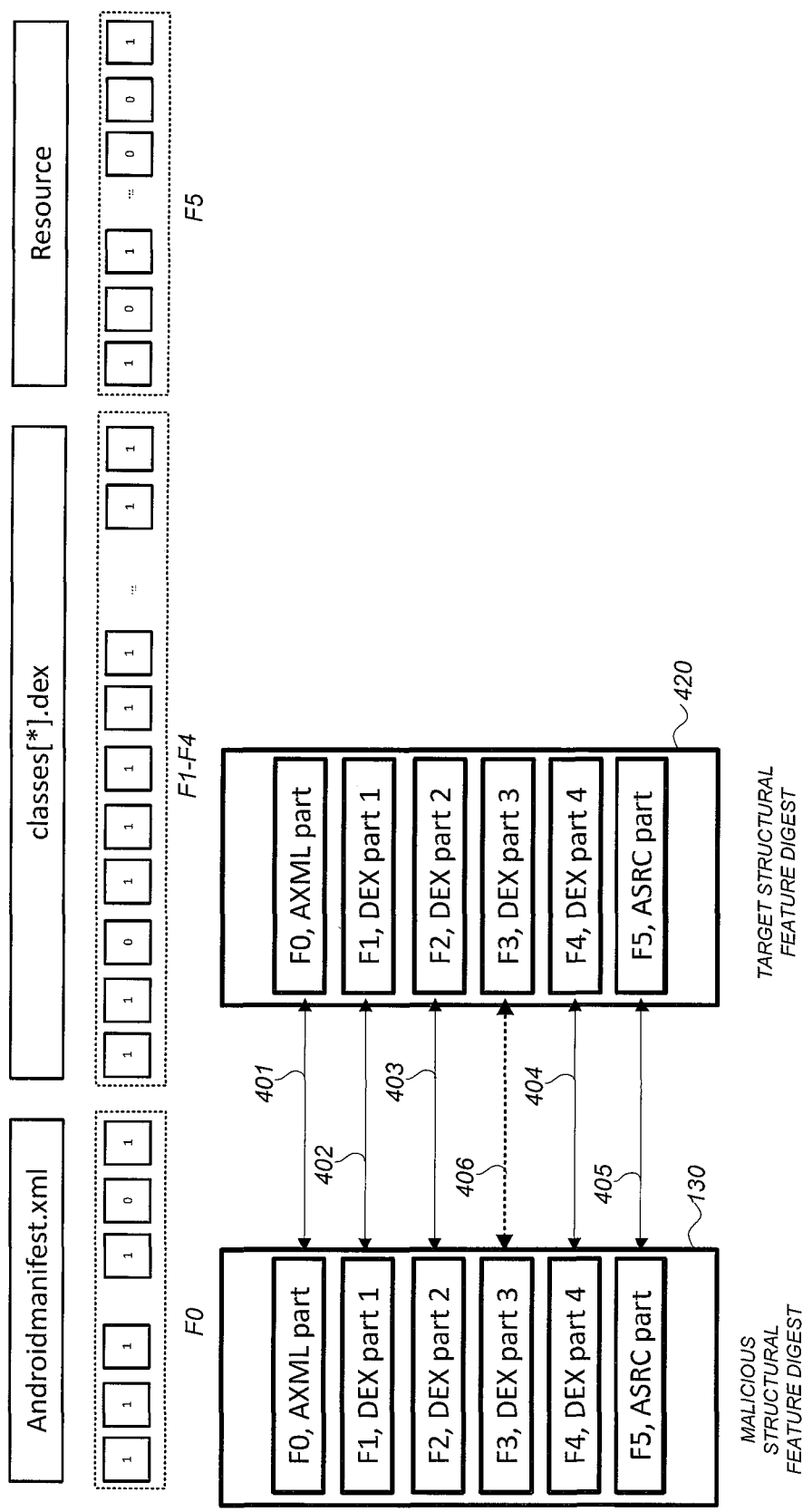
FIG. 10 shows an example of segmenting a structural feature digest into separate chunks in accordance with an embodiment of the present invention.

FIG. 10 shows an example where a 192-bit structural feature digest of an APK file is segmented into separate 32-bit chunks, in accordance with an embodiment of the present invention. Segmentation advantageously allows for quick split queries using the pigeonhole principle, for example. In the example of FIG. 10, the chunk F0 is a 32-bit portion of the structural feature digest for the manifest part, the chunks F1-F4 are four separate 32-bit portions (total of 128 bits) of the structural feature digest for the bytecode part, and the chunk F5 is a 32-bit portion of the structural feature digest for the resource part. In the example of FIG. 10, a structural feature digest 130 is being compared to a target structural feature digest 420. Each corresponding chunks may be compared separately from other chunks. Chunk comparisons may also be performed in parallel. As a particular example, assuming chunks F0, F1, F2, F4, and F5 of the two digests compared to be equal (see arrows 401-405), and knowing that variants of the malicious mobile app are within a mathematical distance of 1, the chunks F3 (i.e., the remaining chunks) only need to be compared (see arrow 406) to see if they are equal or within a mathematical distance of 1.

Some packing software for ANDROID mobile apps is able to encrypt an original "classes.dex" file, use an ELF binary to decrypt the "classes.dex" file to memory at runtime, and then execute via the "DexclassLoader". In other words, the packing software can change the overall structure and flow of an APK file, which is more complicated than obfuscation techniques. Fortunately, the packing software only encapsulates the original "classes.dex" file, but the real core part of an APK file should also contain the manifest and resource parts. The manifest part determines which permissions and runtime components are used by the APK file, and the resource part contains an application user interface that is displayed on the screen of the mobile device. When an unknown mobile app and a known malicious mobile app have the same packed "classes.dex" but their manifest and resource parts are the same or similar, the unknown mobile app may be deemed to be a variant of the known malicious mobile app.

Figure 11:
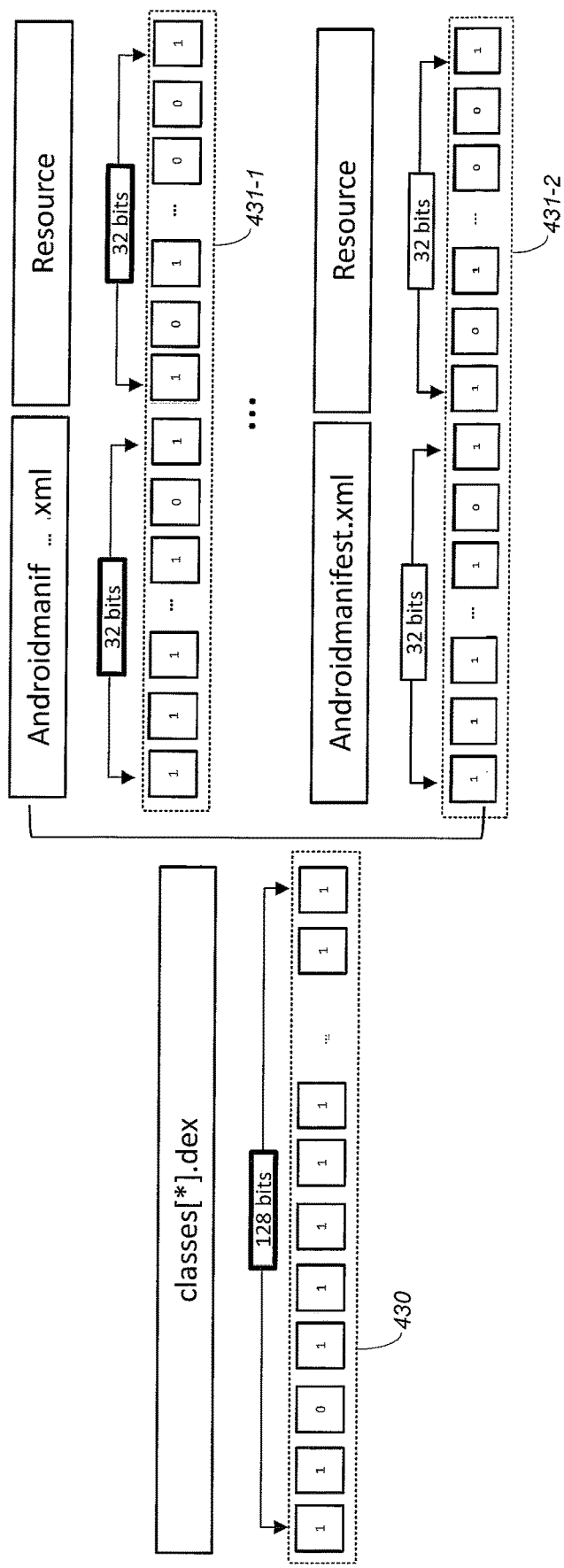
FIG. 11 pictorially illustrates structural feature digests of a family of malicious mobile apps in accordance with an embodiment of the present invention.

FIG. 11 pictorially illustrates structural feature digests of a family of malicious mobile apps in accordance with an embodiment of the present invention. In the example of FIG. 11, the variants of the family will have the same bytecode parts. In one embodiment, the bytecode parts are represented as four 32-bit chunks (see FIG. 11, 430) that are in the middle of the structural feature digest. In the case of variants of the same family that have been packed using the same packing software, the chunks of the structural feature digest for the manifest and resource parts (see FIG. 11, 431-1, 431-2, ..., 431-n) of the different variants will be the same or similar. Accordingly, a family of malicious mobile apps may be identified by finding mobile apps that have the same bytecode parts and the same or similar manifest and resource parts. This feature of the invention is useful not only for detecting malicious mobile apps, but also for clustering malicious mobile apps for research purposes.

Figure 12:
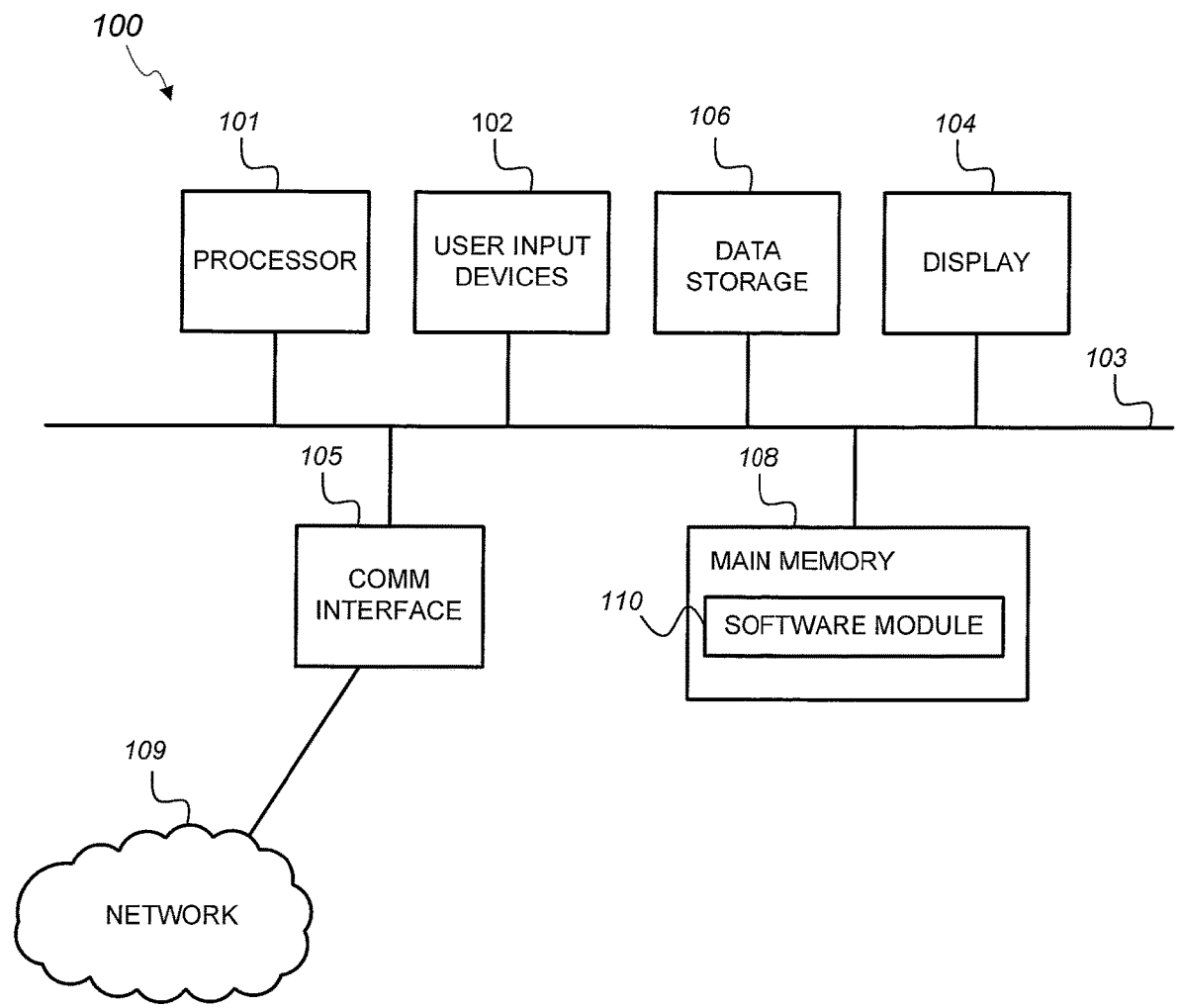
FIG. 12 shows a logical diagram of a computer system that may be employed with embodiments of the present invention.

FIG. 12 shows a logical diagram of a computer system 100 that may be employed with embodiments of the present invention. The computer system 100 may be employed as a mobile device or backend system, for example. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., touchscreen or keyboard), one or more data storage devices 106 (e.g., hard drive, solid state drive), a display screen 104, a communications interface 105, and a main memory 108 (e.g., random access memory). The communications interface 105 may be coupled to a network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In an embodiment where the computer system 100 is configured as a mobile device, the software modules 110 comprise a mobile malware detector. In an embodiment where the computer system 100 is configured as a backend system, the software module 110 may comprise instructions for generating, storing, and searching structural feature digests as described above.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting malicious mobile apps, the method comprising:
receiving a target mobile app in a mobile device, the target mobile app being received as a first package file comprising a manifest part, a bytecode part, and a resource part;
in the mobile device, generating a target digest that represents contents of the manifest part, the bytecode part, and the resource part of the first package file;
providing the target digest from the mobile device to a backend system over a computer network;
in the backend system, determining similarity of the target digest to a structural feature digest of a second package file of a malicious mobile app, the structural feature digest of the second package file representing contents of a manifest part, a bytecode part, and a resource part of the second package file; and
detecting that the target mobile app is malicious in response to detecting that the target digest is similar to the structural feature digest of the second package file.

2. The method of claim 1, wherein generating the target digest comprises:
extracting contents from the manifest part, the bytecode part, and the resource part of the first package file;
using a non-cryptographic hash function, generating initial digests of the contents of the manifest part, the bytecode part, and the resource part of the first package file;
for each bit position of the initial digests, converting a logical 0 to an integer −1 and multiplying a result of the conversion by a scaling factor to generate a scaled value;
adding all scaled values in same bit positions to generate a set of accumulated values; and
projecting the set of accumulated values to a binary number to generate the target digest.

3. The method of claim 2, wherein projecting the set of accumulated values to the binary number comprises:
converting an accumulated value that is equal to or greater than integer 1 to logical 1; and
converting an accumulated value less than integer 1 to a logical 0.

4. The method of claim 2, wherein each initial digest of the bytecode part is that of a trigram of features of the bytecode part.

5. The method of claim 1, further comprising:
sending a result from the backend system to the mobile device over the computer network, the result indicating that the target mobile app is malicious.

6. The method of claim 1, wherein each of the target digest and the structural feature digest are segmented into a plurality of chunks.

7. The method of claim 6, wherein each of the plurality of chunks have a same size.

8. The method of claim 7, wherein each of the plurality of chunks has a total of 32 bits.

9. The method of claim 8, wherein the target digest is a 192-bit binary number.

10. A computer system for detecting malicious mobile apps, the computer system comprising a processor and memory, the memory storing instructions that when executed by the processor cause the computer system to:
generate a structural feature digest of a first package file based on contents of a manifest part, a bytecode part, and a resource part of the first package file, the first package file being that of a malicious mobile app;
determining similarity of the structural feature digest to a target digest, the target digest being based on contents of a manifest part, a bytecode part, and a resource part of a second package file of a target mobile app; and
detecting that the target mobile app is malicious in response to detecting that the target digest and the structural feature digest are within a mathematical distance.

11. The system of claim 10, wherein the instructions stored in the memory, when executed by the processor, generate the structural feature digest by:

using a non-cryptographic hash to generate initial digests of contents of the manifest part, bytecode part, and resource part of the first package file;

for each bit position of the initial digests, converting a logical 0 to an integer −1 and multiplying a result of the conversion by a scaling factor to generate a scaled value;

adding all scaled values in same bit positions to generate a set of accumulated values; and projecting the set of accumulated values to a binary number to generate the target digest.

12. The system of claim 11, wherein the instructions stored in the memory, when executed by the processor, project the set of accumulated values by:

converting each accumulated value that is equal to or greater than integer 1 to logical 1; and converting each accumulated value less than integer 1 to a logical 0.

13. The system of claim 11, wherein each initial digest of the bytecode part is that of a trigram of features of the bytecode part.

14. A method of detecting a malicious mobile app, the method comprising:

generating a structural feature digest of a first package file based on contents of a manifest part, a bytecode part, and a resource part of the first package file, the first package file being that of a malicious mobile app;

determining similarity of the structural feature digest to a target digest, the target digest being based on contents of a manifest part, a bytecode part, and a resource part of a second package file of a target mobile app; and detecting that the target mobile app is malicious in response to detecting that target digest and the structural feature digest are within a mathematical distance.

15. The method of claim 14, wherein generating the structural feature digest comprises:

using a non-cryptographic hash function to generate initial digests of the contents of the manifest part, the bytecode part, and the resource part of the first package file;

for each bit position of the initial digests, converting a logical 0 to an integer −1 and multiplying a result of the conversion by a scaling factor to generate a scaled value;

adding all scaled values in same bit positions to generate a set of accumulated values; and projecting the set of accumulated values to a binary number to generate the structural feature digest.

16. The method of claim 15, projecting the set of accumulated values comprises:

converting an accumulated value that is equal to or greater than integer 1 to logical 1; and converting an accumulated value less than integer 1 to a logical 0.

17. The method of claim 15, wherein an initial digest of the bytecode part is that of a trigram of features of the bytecode part.

* * * * *